(12) United States Patent
Inokuchi (10) Patent No.: US 7,688,308 B2
(45) Date of Patent: Mar. 30, 2010

(54) SIGNAL PROCESSING SYSTEM FOR A POINTING INPUT DEVICE

(75) Inventor: Hiroyuki Inokuchi, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 707 days.

(21) Appl. No.: 10/594,134

(22) PCT Filed: Mar. 10, 2005

(86) PCT No.: PCT/JP2005/004215

§ 371 (c)(1),
(2), (4) Date: Sep. 25, 2006

(87) PCT Pub. No.: WO2005/091126

PCT Pub. Date: Sep. 29, 2005

(65) Prior Publication Data

US 2007/0139385 A1    Jun. 21, 2007

(30) Foreign Application Priority Data

Mar. 23, 2004   (JP) .............................. 2004-085669

(51) Int. Cl.
*G09G 5/08* (2006.01)
*G09G 5/00* (2006.01)
(52) U.S. Cl. ........................ 345/161; 345/156; 345/157
(58) Field of Classification Search ................. 345/161, 345/156, 157; 463/38
See application file for complete search history.

(56) References Cited

U.S. PATENT DOCUMENTS

| | | | | |
|---|---|---|---|---|
| 5,687,080 A | * | 11/1997 | Hoyt et al. | .................... 700/85 |
| 5,696,535 A | * | 12/1997 | Rutledge et al. | ............. 345/156 |
| 5,912,659 A | * | 6/1999 | Rutledge et al. | ............. 345/156 |
| 5,945,979 A | * | 8/1999 | Rutledge et al. | ............. 345/161 |
| 6,429,850 B2 | * | 8/2002 | Marten | ........................ 345/161 |

(Continued)

FOREIGN PATENT DOCUMENTS

JP          61-3231 A       1/1987

(Continued)

*Primary Examiner*—Amare Mengistu
*Assistant Examiner*—Gene W Lee
(74) *Attorney, Agent, or Firm*—Sughrue Mion, PLLC (57) ABSTRACT

Enhancement of responsiveness of a pressure-sensitive pointing device can be realized without deteriorating the performance for removal of low frequency noises. A voltage corresponding to a strain along an x-axis direction of the pressure-sensitive pointing device (11) is amplified by an operational amplifier (3), passes a switch (SW1), then it is digitized by an ADC (7) before being inputted to a digital processing circuit (2). A voltage corresponding to a strain along a y-axis direction of the pressure-sensitive pointing device (11) is amplified by an operational amplifier (4), passes a switch (SW2), then it is digitized by the ADC (7) before being inputted to the digital processing circuit (2). A switch (SW3) is turned on for a predetermined time upon the switchover between the switches (SW1), (SW2) and the output sides of the switches (SW1), (SW2) are connected to a capacitor (6) having large capacitance. The capacitor (6) is charged or discharged at a response speed corresponding to drive capacities of the operational amplifiers (3), (4), so that the voltages corresponding to the strains along the x-axis direction and y-axis direction rapidly reach a given value. Upon elapse of the predetermined time, a low pass filter made up of the resistor (5) and the capacitor (6) removes the low frequency noises.

3 Claims, 7 Drawing Sheets

U.S. PATENT DOCUMENTS

6,486,871 B1 * 11/2002 Marten ........................ 345/157
2003/0085874 A1 * 5/2003 Burry ......................... 345/161

FOREIGN PATENT DOCUMENTS

| JP | 62-216025 A | 9/1987 |
| JP | 7-319617 A | 12/1995 |
| JP | 2635082 | 4/1997 |
| JP | 2003-4562 A | 1/2003 |
| JP | 2004-085669 | 3/2004 |

* cited by examiner

Prior Art

SIGNAL PROCESSING SYSTEM FOR A POINTING INPUT DEVICE

TECHNICAL FIELD

The invention relates to a system for processing signals outputted from a pointing device, and in particular, to a signal processing system capable of effecting rapid switchover between signals along two axes X, Y, or three axes X, Y, Z.

BACKGROUND TECHNOLOGY

A pressure-sensitive pointing device installed in a keyboard of a notebook PC, and so forth is made up such that when a user presses down an operation console of the device in a desired direction with a fingertip, a load applied in that direction is detected by a strain sensor built inside the device, and a detection signal of the strain sensor is processed, whereupon a pointer such as a cursor, or the like, shown on a display of the notebook PC, is caused to shift. At this point in time, a shifting direction of the pointer is determined correspondingly to a direction of the load applied to the tip of the device, and a shifting speed is determined correspondingly to magnitude of the load.

Figure 6:
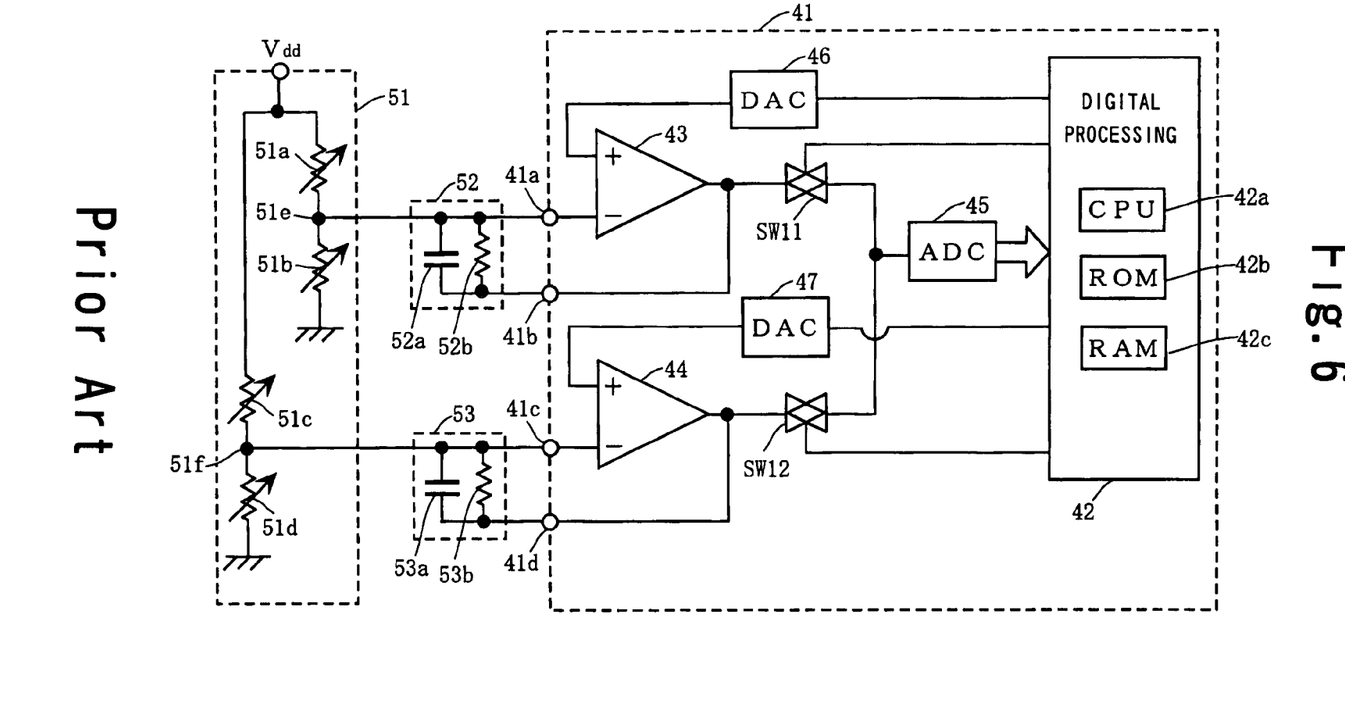
FIG. 6 is a view showing a construction of a conventional signal processing system.

As a conventional signal processing system for processing output signals of a pressure-sensitive pointing device (hereinafter referred to also as a pointing device), there is available an input unit as disclosed in Patent Document 1. FIG. 6 is a block diagram showing the input unit.

An output signal of a pressure-sensitive pointing device 51 is inputted to such a signal processing system 41. The pressure-sensitive pointing device 51 comprises a strain sensor 51a for detecting a load in a plus direction along an x-axis (hereinafter referred to as a +X direction), a strain sensor 51b for detecting a load in a minus direction along the x-axis (hereinafter referred to as a −X direction), a strain sensor 51c for detecting a load in a plus direction along a y-axis (hereinafter referred to as a +Y direction), and a strain sensor 51d for detecting a load in a minus direction along the y-axis (hereinafter referred to as a −Y direction), the respective loads resulting from an operation of an operation console, not shown. The strain sensors 51a, 51b, 51c, 51d each are made up of a strain gauge such as a piezoelectric resistance element, and when the operation console, not shown, is operated in the +X direction, the −X direction, the +Y direction, and the −Y direction, respectively, the strain sensors 51a, 51b, 51c, 51d each are pressed downward corresponding to respective directions of operations, and respective resistance values thereof undergo a change due to the respective loads applied thereto. The strain sensors 51a, 51b are connected in series, and the strain sensors 51c, 51d are connected in series. In this case, the x-axis refers to an axis in a side-to-side direction or in the lateral direction of the pointing device 51, as seen from a user, while the y-axis refers to an axis in a front-to-back direction or the longitudinal direction of the pointing device 51. Further, the x-axis corresponds to a side-to-side direction, or the lateral direction, on a display of a notebook PC, and so forth, in which the pointing device 51 is installed, and the y-axis corresponds to a front-to-back direction or the longitudinal direction, on the display. Such series-connected circuits as described are connected in parallel, forming a parallel-connected circuit, and a power supply voltage Vdd is fed to the parallel-connected circuit.

The four strain sensors, under no load, are equal in resistance value, however, when the operation console is operated in the +X direction, the −X direction, the +Y direction, and the −Y direction, respectively, the resistance value of any of the strain sensors 51a, 51b, 51c, 51d, positioned in the direction of an operation, undergoes a change, whereupon a strain along the x-axis direction is detected as a voltage change via a node 51e between the strain sensors 51a, 51b while a strain along the y-axis direction is detected as a voltage change via a node 51f between the strain sensors 51c, 51d. If the operation console is pressed down in a slanting direction (a direction within a plane containing the x-axis, and the y-axis, but nonparallel to the x-axis and the y-axis) at this point in time, there are detected a stain corresponding to an x-axis direction component of a vector in a direction in which the operation console is pressed down, and a stain corresponding to a y-axis direction component of the vector. Upon removal of the load, the respective resistance values of the strain sensors revert to the respective resistance values thereof, under no load, and potentials at the nodes 51e, 51f, respectively, revert to respective values before the voltage change.

Low-pass filters 52, 53 comprise capacitors 52a, 53a, and resistors 52b, 53b, respectively, and with the low-pass filters 52, 53, an upper cut-off frequency is set to on the order of 150 Hz so as to remove low frequency noise components out of respective output signals of operational amplifiers 43, 44, to be described later. Further, an output side of the low-pass filter 52 is connected to terminals 41a, 41b of the signal processing system 41, respectively, and an output side of the low-pass filter 53 is connected to terminals 41c, 41d of the signal processing system 41, respectively.

The signal processing system 41 comprises a digital processing circuit 42 having a CPU 42a, ROM 42b, RAM 42c, for executing control of the signal processing system 41 in whole, and so forth, the operational amplifier 43 having an inverting input side connected to the terminal 41a, and a noninverting input side connected to an output side of a digital-to-analog converter (hereinafter referred to as a DAC) 46 to be described later, an output side of the operational amplifier 43 being connected to the terminal 41b, the operational amplifier 44 having an inverting input side connected to the terminal 41c, and a noninverting input side connected to an output side of a DAC 47 to be described later, an output side of the operational amplifier 44 being connected to the terminal 41d, an analog switch SW 11 connected to the output side of the operational amplifier 43, an analog switch SW 12 connected to the output side of the operational amplifier 44, an analog-to-digital converter (hereinafter referred to as an ADC) 45 having an input side connected to a common output side of the analog switches SW 11, SW 12, and having an output side connected to an input side of the digital processing circuit 42, the DAC 46 having an input side connected to an output side of the digital processing circuit 42, and having the output side connected to the noninverting input side of the operational amplifier 43, and the DAC 47 having an input side connected to the output side of the digital processing circuit 42, and having the output side connected to the noninverting input side of the operational amplifier 44. The low-pass filters 52, 53 serve as feedback circuits of the operational amplifiers 43, 44, respectively.

There is described hereinafter an operation of the signal processing system 41 having such a configuration described as above.

The voltage corresponding to the strain along the x-axis direction, outputted from the node 51e of the pressure-sensitive pointing device 51, is inputted from the terminal 41a to the inverting input side of the operational amplifier 43. Similarly, the voltage corresponding to the strain along the y-axis direction, outputted from the node 51f of the pressure-sensitive pointing device 51, is inputted from the terminal 41c to the inverting input side of the operational amplifier 44. Reference data outputted from the digital processing circuit 42 is converted into an analog reference voltage by the DAC 46 to be subsequently inputted to the noninverting input side of the operational amplifier 43. The reference data outputted from the digital processing circuit 42 is converted into the analog reference voltage by the DAC 47 to be subsequently inputted to the noninverting input side of the operational amplifier 44. Now, assuming that the strain sensors 51a, 51b, 51c, 51d, under no load, each have a resistance value Rs, and the resistors 52b, 53b of the low-pass filters 52, 53, respectively, each have a resistance value Rf, the operational amplifiers 43, 44 each have a gain of −{Rf/(Rs/2)}, so that a change (on the order of ±10 mV) in the voltage corresponding to the strains along the x-axis, and the y-axis, respectively, can be amplified to a voltage change (on the order of ±1 V) centering around the analog reference voltage.

Figure 7:
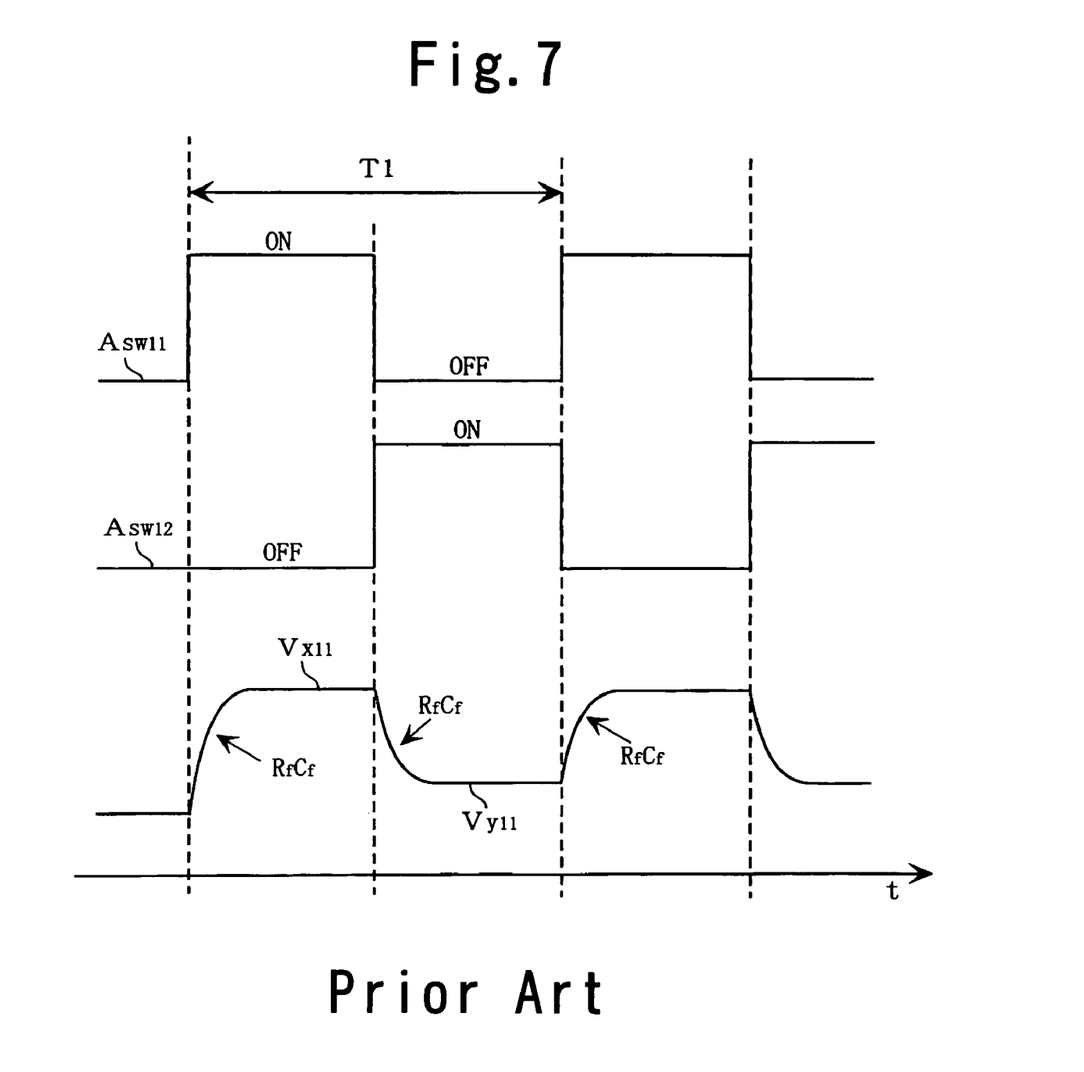
FIG. 7 is an operation timing chart of the conventional signal processing system.

Rectangular waves Asw 11, and Asw 12, undergoing an alternate change in level for every detection period T1 (for example, every 10 msec) as shown in FIG. 7, are inputted as switching control signals to the analog switches SW 11, SW 12, respectively. The analog switches SW 11, SW 12 are turned ON, respectively, during a period when the rectangular waves Asw 11, and Asw 12 are being held high, respectively, while the analog switches SW 11, SW 12 are turned OFF, respectively, during a period when the rectangular waves Asw 11, and Asw 12 are being held low, respectively, so that the analog switches SW 11, SW 12 are alternately turned ON during the detection period T1. Accordingly, a voltage Vx 11, corresponding to the strain along the x-axis direction, and a voltage Vy 11, corresponding to the strain along the y-axis, alternately appear on the common output side of the analog switches SW 11, SW 12, that is, on the input side of the ADC 45, as shown in FIG. 7. Those voltages Vx 11, Vy 11, corresponding to the respective strains, are digitized by the ADC 45 before being inputted to the digital processing circuit 42.

Patent Document 1: JP 7-319617 A

DISCLOSURE OF THE IVENTION

From the standpoint of a user operating the pressure-sensitive pointing device 51, it is preferable to increase a speed of response of the pointer on the display, to actuation of the pressure-sensitive pointing device 51. In order to speed up the response, it need only be sufficient to shorten the detection period T1 shown in FIG. 7. In the present state of the art, where a considerably faster digital processing circuit is in use, it is amply possible to shorten the detection period T1 to on the order of 2 to 3 msec. With the signal processing system 41 shown in FIG. 6, however, assuming that the capacitors 52a, 53a, of the low-pass filters 52, 53, respectively, each have a capacitance Cf, delay in response, corresponding to a time constant (CfRf), occurs to the voltage Vx 11 and the voltage Vy 11, respectively, on the input side of the ADC 45, at timing of respective switchovers of the analog switches SW 11, SW 12. Because large and small in magnitude of the time constant tends to run counter to high and low of the upper cut-off frequency {1/(2πCfRf)} of each of the low-pass filters 52, 53, if Cf is increased in order to remove low frequency noises, the detection period T1 cannot be shortened, so that it is impossible to enhance the speed of the response of the pointer.

The invention has been developed to resolve such a problem as described, and it is an object of the invention to realize enhancement in responsiveness of a pointing device without causing deterioration in function for removal of low frequency noises. Further, another object of the invention is to concurrently realize enhancement in the responsiveness of the pointing device, and enhancement in the function for removal of the low frequency noises.

MEANS FOR SOLVING PROMBLEM

The invention disclosed in one aspect is a signal processing system for processing signals outputted from a pointing device, said signal processing system comprising a first amplifier for amplifying a detection signal outputted by operating an operation console of the pointing device, along an x-axis direction thereof, a second amplifier for amplifying a detection signal outputted by operating the operation console, along a y-axis direction thereof, a first switching circuit for alternately switching over between respective output signals of the first and second amplifiers by the predetermined period before outputting, and a circuit for ac-grounding an output side of the first switching circuit for predetermined time upon switchover of the first switching circuit.

The invention disclosed in a second aspect is the signal processing system in the previous aspect, wherein the circuit for ac-grounding the output side of the first switching circuit comprises a first low pass filter made up of a resistor and a capacitor, connected between the output side of the first switching circuit and the ground, and a second switching circuit connected to both ends of the resistor, wherein the second switching circuit is turned on upon the switchover of the first switching circuit, and is turned off after the elapse of predetermined time from the switchover.

The invention disclosed in a third aspect is a signal processing system for processing signals outputted from a pointing device, the pointing device comprising detection means capable of outputting respective detection signals outputted by operating an operation console in plus and minus directions, along an x-axis, and a y-axis, thereof, respectively, in such a way as to identify whether an operation is in either the plus direction or the minus direction, along the x-axis, and the y-axis, respectively, or in both the plus and minus directions, along the x-axis, and the y-axis, respectively, a first outputting means for fetching the detection signals outputted by the operation in either the plus direction or the minus direction, along the x-axis, and the y-axis, respectively, from the detection means, and a second outputting means for fetching the detection signals outputted by the operations in both the plus and minus directions, along the x-axis, and the y-axis, respectively, said signal processing system comprising a first switching circuit for alternately switching over between the detection signals by the operation along an x-axis direction, and a y-axis direction, respectively, outputted from the first outputting means, before outputting, a first amplifier for amplifying the detection signals by the operation along the x-axis direction, and the y-axis direction, respectively, outputted from the first switching circuit, a second amplifier for amplifying output signals of the second outputting means, a second switching circuit for alternately switching over between respective output signals of the first and second amplifiers by the predetermined period before outputting, and a circuit for ac-grounding an output side of the second switching circuit for predetermined time upon respective switchovers of the first and second switching circuits.

The invention disclosed in a fourth aspect is a signal processing system in the third aspect, wherein the detection means preferably comprises a first resistance element having a resistance value undergoing a change corresponding to a load applied thereto, by the operation in the plus direction, along the x-axis, a second resistance element connected in series to the first resistance element, having a resistance value undergoing a change corresponding to a load applied thereto, by the operation in the minus direction, along the x-axis, a third resistance element having a resistance value undergoing a change corresponding to a load applied thereto, by the operation in the plus direction, along the y-axis, and a fourth resistance element connected in series to the third resistance element, having a resistance value undergoing a change corresponding to a load applied thereto, by the operation in the minus direction, along the y-axis, wherein a power supply is fed to one end of each of series-connected circuits, and a terminal connected to a node between the first and second resistance elements, and a terminal connected to a node between the third and fourth resistance elements serve as the first outputting means while a terminal connected to the end of each of the series-connected circuits, on a side adjacent to the power supply, serves as the second outputting means.

The invention disclosed in a fifth aspect is the signal processing system in the third aspect, wherein the circuit for ac-grounding the output side of the first switching circuit comprises a first low pass filter made up of a resistor and a capacitor, connected between the output side of the second switching circuit and the ground, and a third switching circuit connected to both ends of the resistor, wherein the third switching circuit is turned on upon respective switchovers of the first and second switching circuits, and is turned off after the elapse of predetermined time from the respective switchovers.

The invention disclosed in a sixth aspect is the signal processing system in the second aspect or the fifth aspect, further comprises a second low pass filter for removing low frequency noises of the output signal of the first amplifier, and a third low pass filter for removing low frequency noises of the output signal of the second amplifier, wherein an upper cut-off frequency of the first low pass filter is set lower than respective upper cut-off frequencies of the second, and third low pass filters.

According to the first aspect of the invention, the output side of the first switching circuit is ac-grounded for the predetermined time upon the switchover of the first switching circuit, so that a response waveform at the rising edge or the falling edge of a voltage outputted from the first switching circuit at that point in time is dependent on the respective drive capacities of the first and second amplifiers. Accordingly, a response speed is significantly increased in comparison with that in the case of the conventional signal processing system where a response speed varies according to the respective time constants of the low-pass filters for removing low frequency noises of the respective output signals of the operational amplifiers.

According to the second aspect of the invention, since both the ends of the resistor are short-circuited upon the switchover of the first switching circuit, the response waveform at the rising edge or the falling edge of the voltage outputted from the first switching circuit at that point in time is dependent on the respective drive capacities of the first and second amplifiers. Accordingly, the response speed is significantly increased in comparison with that in the case of the conventional signal processing system where the response speed varies according to the respective time constants of the low-pass filters for removing low frequency noises of the respective output signals of the operational amplifiers. Further, after the elapse of the predetermined time from the switchover, the first low pass filter is activated, so that low frequency noises are removed.

According to the third and fourth aspects of the invention, the output side of the second switching circuit is ac-grounded for the predetermined time upon the respective switchovers of the first, and second switching circuits, so that the response waveform at the rising edge or the falling edge of the voltage outputted from the second switching circuit at that point in time is dependent on the respective drive capacities of the first and second amplifiers. Accordingly, the response speed is significantly increased in comparison with that in the case of the conventional signal processing system where the response speed varies according to the respective time constants of the low-pass filters for removing low frequency noises of the respective output signals of the operational amplifiers.

According to the fifth aspect of the invention, upon the respective switchovers of the first and second switching circuits, both the ends of the resistor is short-circuited for the predetermined time from the respective switchovers, so that the response waveform at the rising edge or the falling edge of the voltage outputted from the second switching circuit at the time of the respective switchovers is dependent on the respective drive capacities of the first and second amplifiers. Accordingly, the response speed is significantly increased in comparison with that in the case of the conventional signal processing system where the response speed varies according to the respective time constants of the low-pass filters for removing low frequency noises of the respective output signals of the operational amplifiers. Further, after the elapse of the predetermined time, the first low pass filter is activated, so that the low frequency noises are removed.

According to the sixth aspect of the invention, since the first low pass filter has higher performance for removal of the low frequency noises than respective performances of the second and third low pass filters, overall performance for removal of the low frequency noises is enhanced. Furthermore, capacitance of the respective capacitors of the second and third low pass filters can be reduced in inverse proportion to an increase in capacitance of the capacitors of the first low pass filter.

EFFECT OF INVENTION

With the signal processing system according to the invention, it is possible to reaslize shortening of the detection period along the two-axis directions or three-axis directions, and also to realize maintenance or enhancement of the performance for removal of the low frequency noises. Hence, by processing the output signals of the pointing device with the use of the signal processing system according to the invention, the performance for removal of the low frequency noises can be kept or enhanced while responsiveness of the pointing device can be enhanced.

BEST MODE FOR CARRYING OUT THE INVENTION

Preferred embodiments of the invention are described hereinafter with reference to the accompanying drawings.

First Embodiment

Figure 1:
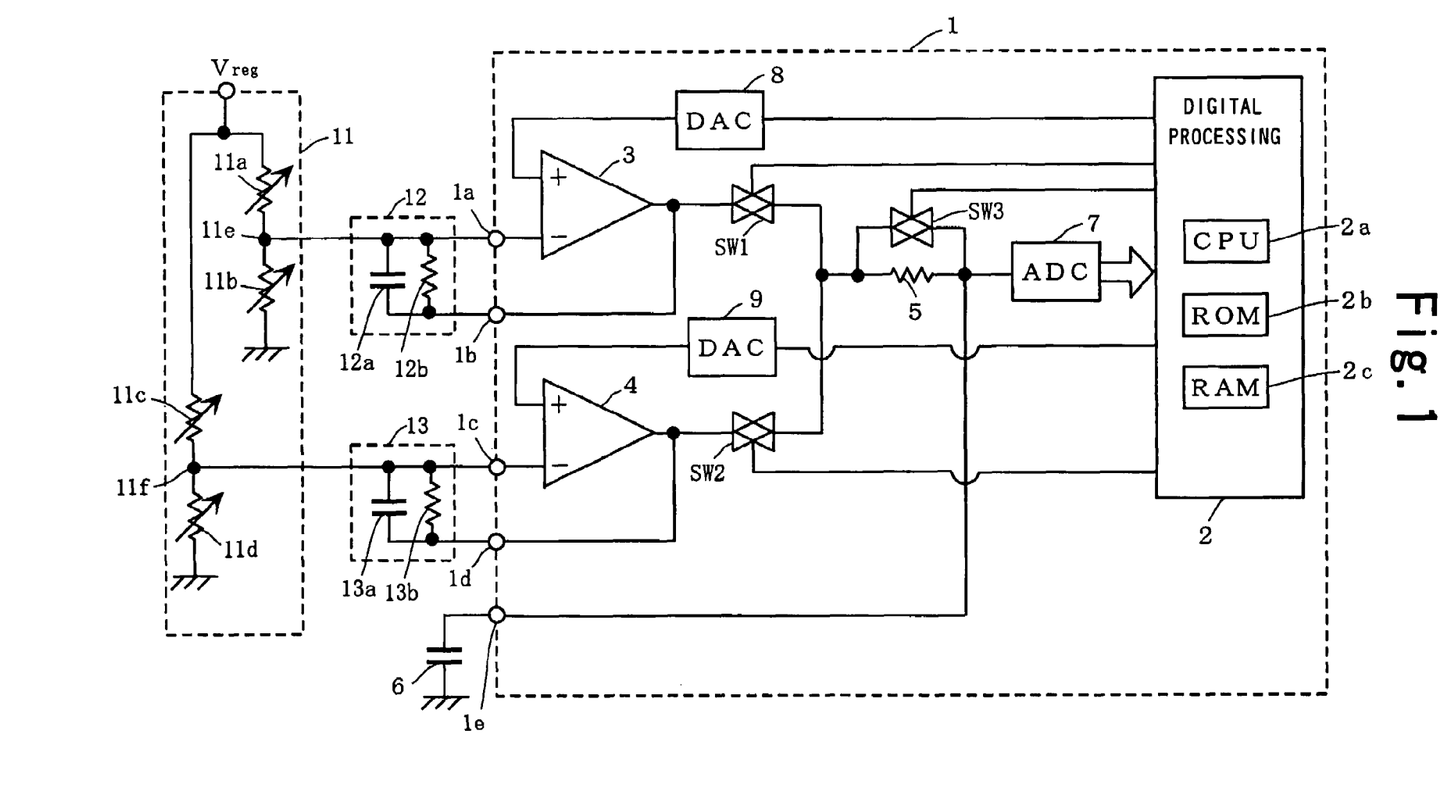
FIG. 1 is a view showing a construction of a first embodiment of a signal processing system according to the invention.
Figure 2:
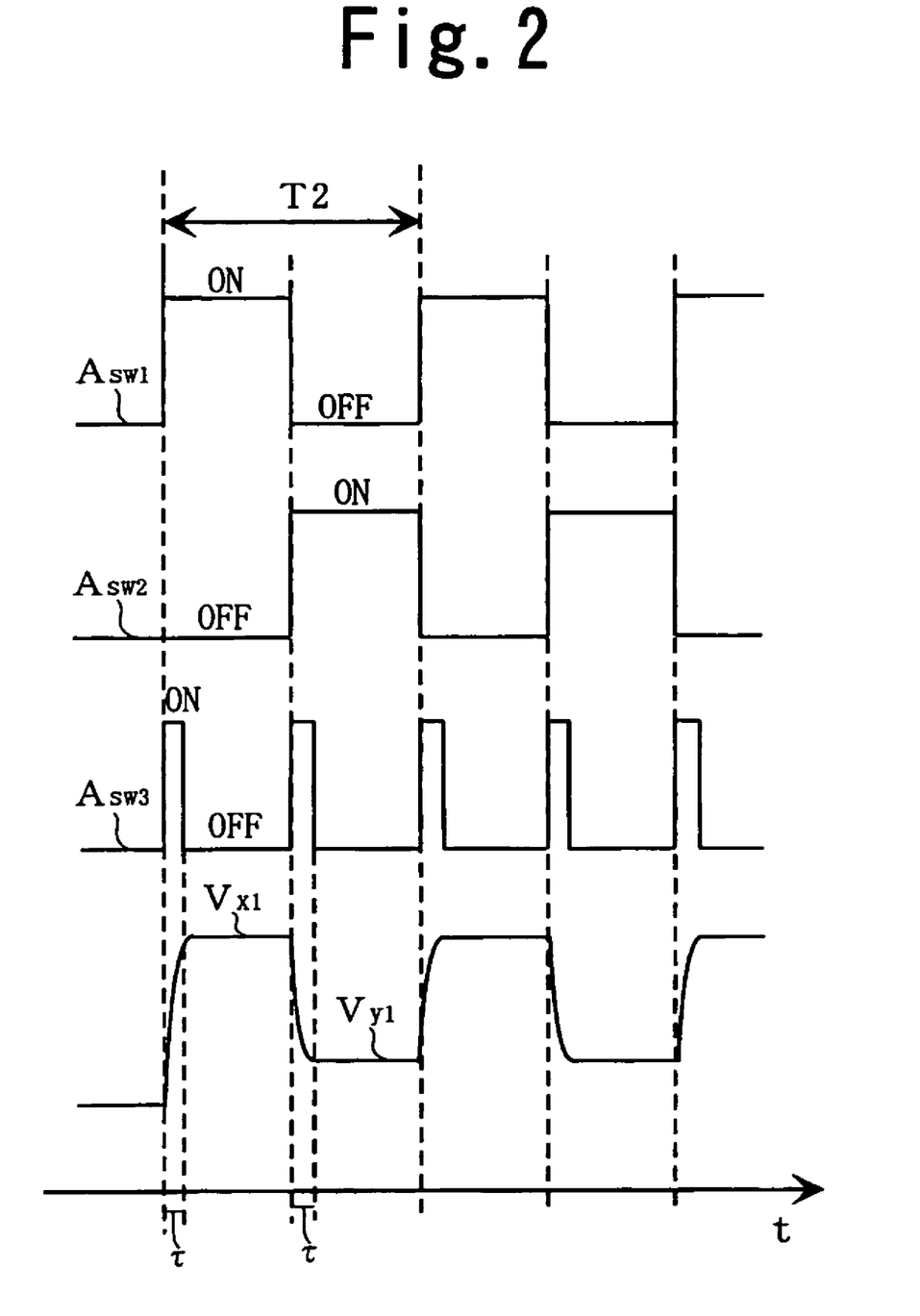
FIG. 2 is an operation timing chart of the signal processing system according to the first embodiment.
Figure 3:
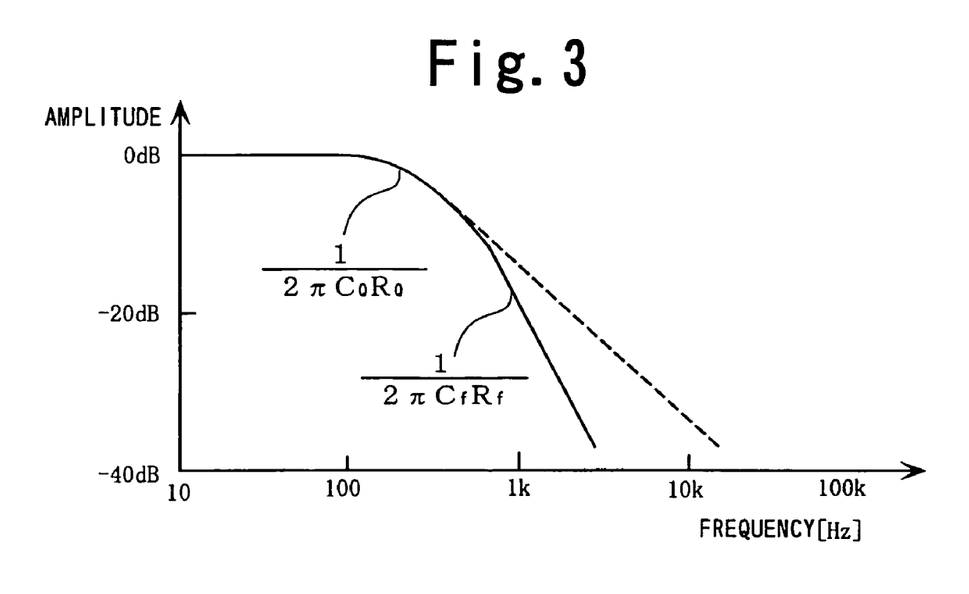
FIG. 3 is a view for illustrating frequency characteristics of the signal processing system according to the first embodiment.

FIG. 1 is a view for illustrating a first embodiment of a signal processing system according to the invention, FIG. 2 is view showing an example of an operation timing chart thereof, and FIG. 3 is a view for illustrating frequency characteristics thereof by way of example.

The signal processing system 1 according to the present embodiment is made up of ICs, and as shown in FIG. 1, an output signal of a pressure-sensitive pointing device 11 is inputted to the signal processing system 1 via low-pass filters 12, 13, respectively. The pressure-sensitive pointing device 11 comprises a strain sensor 11a for detecting a load in the +X direction, a strain sensor 11b for detecting a load in the -X direction, a strain sensor 11c for detecting a load in the +Y direction, and a strain sensor 11d for detecting a load in the -Y direction, the respective loads resulting from an operation of an operation console, not shown. The strain sensors 11a, 11b, 11c, 11d each are made up of a strain gauge such as a piezoelectric resistance element, and when the operation console, not shown, is operated in the +X direction, the -X direction, the +Y direction, and the -Y direction, respectively, the strain sensors 11a, 11b, 11c, 11d each are pressed downward corresponding to respective directions of operation, and respective resistance values thereof undergo a change due to the respective loads applied thereto. The strain sensors 11a, 11b are connected in series, and the strain sensors 11c, 11d are connected in series. Such series-connected circuits as described are connected in parallel, forming a parallel-connected circuit, and a power supply voltage Vdd at a stabilized constant potential Vreg is fed to the parallel-connected circuit.

The four strain sensors, under no load, are equal in resistance value, however, when the operation console is operated in the respective directions, a resistance value of any of the strain sensors, in the direction of operation, undergoes a change, whereupon a strain along the x-axis direction is detected as a voltage change via a node 11e between the strain sensors 11a, 11b while a strain along the y-axis direction is detected as a voltage change via a node 11f between the strain sensors 11c, 11d. Upon removal of the loads, the respective resistance values of the strain sensors revert to the respective resistance values under no load, and potentials at the nodes 11e, 11f, respectively, revert to the respective values before the respective voltage changes.

The low-pass filters 12, 13 comprise capacitors 12a, 13a, and resistors 12b, 13b, respectively, and with the low-pass filters 12, 13, respectively, an upper cut-off frequency is set in such a way as to remove low frequency noise components out of respective output signals of operational amplifiers 3, 4, to be described later. Further, an output side of the low-pass filter 12 is connected to terminals 1a, 1b of the signal processing system 1, respectively, and an output side of the low-pass filter 13 is connected to terminals 1c, 1d of the signal processing system 1, respectively. Those low-pass filters 12, 13 are equivalent in basic function to the conventional low-pass filters 52, 53. However, the signal processing system 1 is provided with a low pass filter comprising a resistor 5 and a capacitor 6, as described later, and if an upper cut-off frequency of the low pass filter is set to on the order of 150 Hz as with the conventional circuit, the respective upper cut-off frequencies of the low-pass filters 12, 13 may be set to, for example, on the order of 1500 Hz. By so doing, respective capacitances of the capacitors 12a, 13a can be rendered as small as 1/10 those of the capacitors 52a, 53a, so that the capacitors 12a, 13a can be installed inside the signal processing system 1 made up of the ICs.

The signal processing system 1 comprises a digital processing circuit 2 having a CPU 2a, ROM 2b, RAM 2c, for executing control of the signal processing system 1 in whole, and so forth, the operational amplifier 3 having an inverting input side connected to the terminal 1a, and a noninverting input side connected to an output side of a DAC 8 to be described later, an output side of the operational amplifier 3 being connected to the terminal 1b, the operational amplifier 4 having an inverting input side connected to the terminal 1c, and a noninverting input side connected to an output side of a DAC 9 to be described later, an output side of the operational amplifier 4 being connected to the terminal 1d, an analog switch SW 1 connected to the output side of the operational amplifier 3, an analog switch SW 2 connected to the output side of the operational amplifier 4, a parallel circuit made up of the resistor 5 and a switch SW 3, connected to a common output side of the analog switches SW 1, SW 2, the capacitor 6 coupled between a terminal 1e on an output side of the parallel circuit, and the ground, an ADC 7 having an input side connected to the output side of the parallel circuit, and having an output side connected to an input side of the digital processing circuit 2, the DAC 8 having an input side connected to an output side of the digital processing circuit 2, and having the output side connected to the noninverting input side of the operational amplifier 3, and the DAC 9 having an input side connected to the output side of the digital processing circuit 2, and having the output side connected to the noninverting input side of the operational amplifier 4.

Accordingly, the low-pass filters 12, 13 serve as feedback circuits of the operational amplifiers 3, 4, respectively. Further, the resistor 5 and the capacitor 6 function as the low pass filter for removing the low frequency noise components. The power supply voltage Vdd, not shown, at the stabilized and constant potential Vreg is fed to the signal processing system 1 in whole. Since the power supply voltage that is stable as described is fed, offset voltages of the operational amplifiers 3, 4, respectively, become smaller in value, so that it is possible to render respective areas of the operational amplifiers 3, 4 smaller than those for the conventional operational amplifiers 43, 44.

With the signal processing system 1 having such a configuration as described, constituents thereof corresponding in reference character to those of the conventional signal processing system 41 have each an identical configuration and function. Hence, it can be said that the signal processing system 1 is equivalent to the conventional signal processing system 41 with addition of the low pass filter comprising the resistor 5 and the capacitor 6, and the switch SW 3 parallel-connected to the resistor 5.

There is described hereinafter an operation of the signal processing system 1 having the configuration described as above. In this case, respective operations whereby the voltage corresponding to the strain along the x-axis direction, outputted via the node 11e of the pointing device 11, is amplified by the operational amplifier 3, and the voltage corresponding to the strain along the y-axis direction, outputted via the node 11f of the pointing device 11, is amplified by the operational amplifier 4 are the same as with the case of the conventional signal processing system 41, omitting therefore description thereof.

Rectangular waves Asw 1, and Asw 2, undergoing an alternate change in level for every detection period T2 (for example, every 3 msec) as shown in FIG. 2, are inputted as switching control signals from the digital processing circuit 2 to the analog switches SW 1, SW 2, respectively. The analog switches SW 1, SW 2 are each turned ON during a period when the rectangular waves Asw 1, and Asw 2 are being held high, respectively, while the analog switches SW 1, SW 2 are each turned OFF during a period when the rectangular waves Asw 1, and Asw 2 are being held low, respectively, so that the analog switches SW 1, SW 2 are alternately turned ON during the detection period T2. Further, a rectangular wave Asw 3 as shown in FIG. 2 is inputted as a switching control signal from the digital processing circuit 2 to the switch SW 3. The rectangular wave Asw 3 is being held high for predetermined time $\tau$ from a time when the rectangular waves Asw 1, and Asw 2 each undergo the alternate change in level, and is being held low during the detection period T2 except the predetermined time $\tau$. Because the switch SW 3 is turned ON during a period when the rectangular wave Asw 3 is being held high, and is turned OFF during a period when the rectangular wave Asw 3 is being held low, the switch SW 3 is in the ON-condition only for the predetermined time $\tau$ from a start time of respective switchovers of the analog switches SW 1, and SW 2. When the switch SW 3 is turned ON, both ends of the resistor 5 are short-circuited, so that the voltage Vx 1 corresponding to the strain along the x-axis, and the voltage Vy 1 corresponding to the strain along the y-axis, alternately appear on the input side of the ADC 7, as shown in FIG. 2. Those voltages Vx 1, Vy 1, corresponding to the respective strains, are digitized by the ADC 7 before being inputted to the digital processing circuit 2.

Now, upon the switch SW 3 being turned ON, the capacitor 6 is charged or discharged at a response speed corresponding to a drive capacity of the operational amplifier 3, so that the voltage Vx 1 corresponding to the strain along the x-axis undergoes a change at a response speed corresponding to the drive capacity of the operational amplifier 3, and the capacitance of the capacitor 6. Such a response speed as described is sufficiently faster than the response speed of the conventional signal processing system 41, corresponding to the respective time constants of the low-pass filters 52, 53, so that a waveform of the voltage Vx 1 will rapidly reach a given value. The same applies to the voltage Vy 1 corresponding to the strain along the y-axis.

Upon the switch SW 3 being turned OFF after the elapse of the predetermined time $\tau$, there is formed an equivalent circuit of a circuit where the low pass filter comprising the resistor 5 and the capacitor 6 is connected to the common output side of the analog switches SW 1, SW 2. Accordingly, low frequency noises of the voltage corresponding to the strain along the x-axis, as an output of the operational amplifier 3, are removed by the low pass filter comprising the resistor 5 and the capacitor 6, and the low-pass filter 12 while low frequency noises of the voltage corresponding to the strain along the y-axis, as an output of the operational amplifier 4, are removed by the low pass filter comprising the resistor 5 and the capacitor 6, and the low-pass filter 13.

In this case, assuming that the resistor 5 has a resistance value Rq, and the capacitor 6 has a capacitance value Cq, the resistor 5 and the capacitor 6 serve a primary low pass filter having an upper cut-off frequency of $1/(2\pi CqRq)$. If the resistance value Rq is set to, for example, 1/10 of the resistance value Rf of each of the conventional resistors 52b, 53b, and the capacitance value Cq is set to, for example, 10 times as large as the capacitance Cf of each of the conventional capacitors 52a, 53a, this will render the upper cut-off frequency equivalent to that of each of the conventional low-pass filters 52, 53, so that the primary low pass filter can have the same performance for removal of the low frequency noises as that for each of the conventional low-pass filters 52, 53. Assuming that the respective capacitors 12a, 13a of the low-pass filters 12, 13 have each a capacitance Cf, and the respective resistors 12b, 13b have each a resistance value Rf, the low-pass filters 12, 13 become a primary low pass filter having an upper cut-off frequency of $1/(2\pi CfRf)$. Accordingly, the respective output voltages of the operational amplifiers 3, 4 are caused to come out by way of the low pass filters in two stages, made up of the primary low pass filter having the upper cut-off frequency of $1/(2\pi CfRf)$ in combination with the primary low pass filter having the upper cut-off frequency of $1/(2\pi CqRq)$. Now, if the capacitance Cf is set to a value smaller than the capacitance Cf of each of the conventional capacitors 52a, 53a, frequency characteristics of the low pass filters in two stages, combined with each other, will become such that a degree of deterioration of gain, in a high-frequency range, becomes greater than that for the conventional case, as shown in FIG. 3, so that performance for removal of noise components higher in frequency is improved.

Second Embodiment

Figure 4:
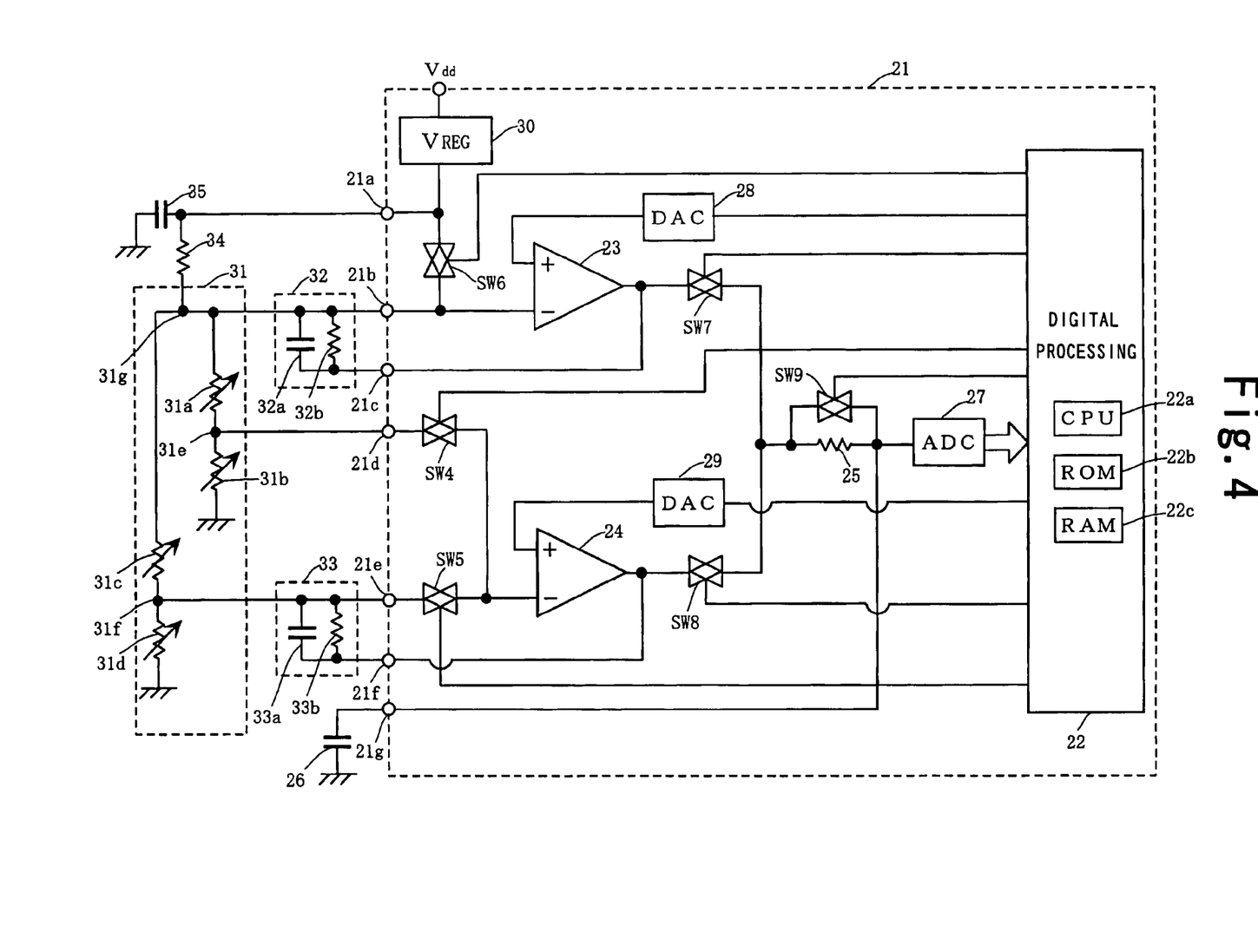
FIG. 4 is a view showing a construction of a second embodiment of a signal processing system according to the invention.
Figure 5:
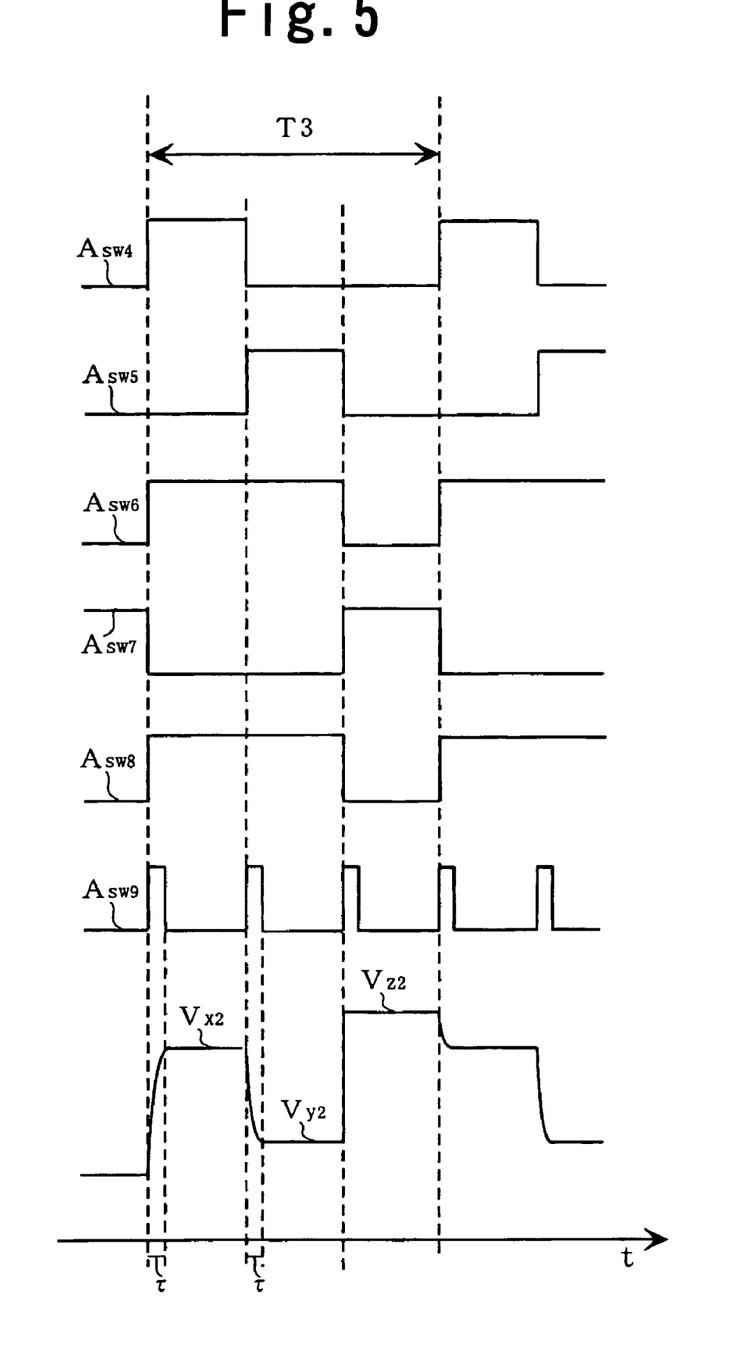
FIG. 5 is an operation timing chart of the signal processing system according to the second embodiment.

FIG. 4 is a view for illustrating a second embodiment of a signal processing system according to the invention, and FIG. 5 is an operation timing chart thereof.

As shown in FIG. 4, an output signal of a pressure-sensitive pointing device 31 is inputted to a signal processing system 21. The pressure-sensitive pointing device 31 comprises a strain sensor 31a for detecting a load in the +X direction, a strain sensor 31b for detecting a load in the −X direction, a strain sensor 31c for detecting a load in the +Y direction, and a strain sensor 31d for detecting a load in the −Y direction, the respective loads resulting from an operation of an operation console, not shown. The strain sensors 31a, 31b, 31c, 31d each are made up of a strain gauge such as a piezoelectric resistance element, and when the operation console, not shown, is operated in the +X direction, the −X direction, the +Y direction, and the −Y direction, respectively, the strain sensors 31a, 31b, 31c, 31d each are pressed downward corresponding to respective directions of the operation, and respective resistance values thereof undergo a change due to respective loads applied thereto. Further, the pressure-sensitive pointing device 31 is made up such that when the operation console is operated in a direction perpendicular to the x-axis, and the y-axis, the strain sensors 31a, 31b, 31c, 31d are all pressed down, and respective resistance values of all the strain sensors 31a, 31b, 31c, 31d undergo a change due to a load applied thereto. The strain sensors 31a, 31b are connected in series, and the strain sensors 31c, 31d are connected in series. Such series-connected circuits as described are connected in parallel, forming a parallel-connected circuit, and a power supply voltage is fed from a regulator 30 to be described later to the parallel-connected circuit via a resistor 34. A capacitor 35 is provided for the purpose of decoupling. In this case, the resistor 34 has a resistance value set to a value equal to the resistance value of the four strain sensors 31a to 31d, under no load.

The four strain sensors, under no load, are equal in resistance value, however, when the operation console is operated in the respective directions, a resistance value of any of the strain sensors, in the direction of operation, undergoes a change, whereupon a strain along the x-axis direction is detected as a voltage change via a node 31e between the strain sensors 31a, 31b while a strain along the y-axis direction is detected as a voltage change via a node 31f between the strain sensors 31c, 31d. Further, a strain along a z-axis direction is detected as a voltage change via a node 31g between the resistor 34, and the strain sensors 31a, 31c. Herein, the z-axis direction refers to the direction perpendicular to the x-axis and the y-axis, and the voltage change at the node 31g, due to the load pressing down the whole operation console of the pressure-sensitive pointing device 31, is detected as the strain along the z-axis direction. Upon removal of the respective loads, the respective resistance values of the strain sensors revert to the respective resistance values under no load, and potentials at the nodes 31e, 31f, 31g, respectively, revert to respective values before the respective voltage changes.

Low-pass filters 32, 33 comprise capacitors 32a, 33a, and resistors 32b, 33b, respectively, and with the low-pass filters 32, 33, respectively, an upper cut-off frequency is set in such a way as to remove low frequency noise components out of respective output signals of operational amplifiers 23, 24, to be described later. Further, an output side of the low-pass filter 32 is connected to terminals 21b, 21c of the signal processing system 21, respectively, and an output side of the low-pass filter 33 is connected to terminals 21e, 21f of the signal processing system 21, respectively. Those low-pass filters 32, 33 are equivalent in basic function to the low-pass filters 12, 13, according to the first embodiment.

The signal processing system 21 comprises a digital processing circuit 22 having a CPU 22a, ROM 22b, RAM 22c, for executing control of the signal processing system 21 in whole, and so forth, the operational amplifier 23 having an inverting input side connected to the terminal 21b, and a noninverting input side connected to an output side of a DAC 28 to be described later, an output side of the operational amplifier 23 being connected to the terminal 21c, the operational amplifier 24 having an inverting input side connected to the terminal 21e, and a noninverting input side connected to an output side of a DAC 29 to be described later, an output side of the operational amplifier 24 being connected to the terminal 21f, an analog switch SW 4 having an input side connected to a terminal 21d, and an output side connected to the inverting input side of the operational amplifier 24, an analog switch SW 5 having an input side connected to the terminal 21e, and an output side connected to the inverting input side of the operational amplifier 24, an analog switch SW 7 connected to the output side of the operational amplifier 23, an analog switch SW 8 connected to the output side of the operational amplifier 24, a parallel circuit made up of a resistor 25 and a switch SW 9, connected to a common output side of the analog switches SW 7, SW 8, a capacitor 26 coupled between a terminal 21g on an output side of the parallel circuit, and the ground, an ADC 27 having an input side connected to the output side of the parallel circuit, and an output side connected to an input side of the digital processing circuit 22, the DAC 28 having an input side connected to an output side of the digital processing circuit 22, and the output side connected to the noninverting input side of the operational amplifier 23, and the DAC 29 having an input side connected to the output side of the digital processing circuit 22, and the output side connected to the noninverting input side of the operational amplifier 24, the regulator 30 for generating a constant potential from the power supply voltage Vdd, and a switch 6 connected between an output side of the regulator 30 and the inverting input side of the operational amplifier 23. Now, a voltage corresponding to the strain along the z-axis direction, outputted via the node 31g, is smaller in amplitude than respective voltages corresponding to the strains along the x-axis direction, and the y-axis direction, respectively, owing to the structure of the pressure-sensitive pointing device 31, so that the operational amplifier 23 preferably has a gain greater than that of the operational amplifier 24.

The output side of the regulator 30 is connected to a terminal 21a, and the resistor 34 and the capacitor 35 are connected to the terminal 21a. Further, a switch SW 6 is connected between the terminal 21a and the terminal 21b. The low-pass filters 32, 33 serve as feedback circuits of the operational amplifiers 23, 24, respectively. Further, the resistor 25 and the capacitor 26 function as a low pass filter for removing low frequency noise components.

Now, there is described hereinafter an operation of the signal processing system 21 having such a configuration described as above.

The voltage corresponding to the strain along the x-axis direction, outputted via the node 31e of the pointing device 31, is fed to the input side of the analog switch SW 4 via the terminal 21d. Further, the voltage corresponding to the strain along the y-axis direction, outputted via the node 31f of the pointing device 31, is fed to the input side of the analog switch SW 5 via the terminal 21e. Still further, the voltage corresponding to the strain along the z-axis direction, outputted via the node 31g, of the pointing device 31 is fed to the inverting input side of the operational amplifier 23 via the terminal 21b.

Rectangular waves Asw 4, Asw 5, and Asw 6, each undergoing a periodical change in level for every detection period T3 (for example, every 4.5 msec) as shown in FIG. 5, are inputted as switching control signals from the digital processing circuit 22 to the analog switches SW 4, SW 5, and the switch SW 6, respectively. The rectangular waves Asw 4, Asw 5 alternately turn high during a period when the rectangular wave Asw 6 is being held high. The analog switches SW 4, SW 5, and the switch SW 6 are each turned ON while the rectangular waves Asw 4, Asw 5, and Asw 6 are being held high, respectively, and the analog switches SW 4, SW 5, and the switch SW 6 are each turned OFF while the rectangular waves Asw 4, Asw 5, and Asw 6 are being held low, respectively, so that the switch SW 6 is alternately turned ON for every detection period T3, and the analog switches SW 4, SW 5 are alternately turned ON while the switch SW 6 is in the ON-condition.

In this connection, because both the ends of the resistor 34 are short-circuited while the switch SW 6 is in the ON-condition, potential at the node 31g of the pointing device 31, and potential on the inverting input side of the operational amplifier 23 are fixed to an output potential of the regulator 30. Accordingly, the voltage corresponding to the strain along the z-axis direction is not inputted to the inverting input side of the operational amplifier 23. During a time period when the switch SW 6 is in the ON-condition, and the analog switch SW 4 is turned ON, the voltage corresponding to the strain along the x-axis direction, outputted from the node 31e of the pointing device 31, is inputted to the inverting input side of the operational amplifier 24 during a time period when the switch SW 6 is in the ON-condition, and the analog switch SW 5 is turned ON, the voltage corresponding to the strain along the y-axis direction, outputted from the node 31f of the pointing device 31, is inputted to the inverting input side of the operational amplifier 24. That is, the voltage corresponding to the strain along the x-axis direction, and the voltage corresponding to the strain along the y-axis direction are alternately inputted to the inverting input side of the operational amplifier 24. Meanwhile, during a time period when the switch SW 6 is in the OFF-condition, the voltage corresponding to the strain along the z-axis direction, outputted from the node 31g of the pointing device 31, is inputted to the inverting input side of the operational amplifier 23.

Now, there is described hereinafter the reason why the resistor 34 is provided. The resistance value of the resistor 34 is set to the value equal to the resistance value of the four strain sensors 31a to 31d, under no load, as previously described. Accordingly, assuming that the output potential of the regulator 30 is Vreg, potentials at the nodes 31e, 31f, respectively, under no load, become Vreg/2 during the time period when the switch SW 6 is in the ON-condition, so that the voltage corresponding to the strain along the x-axis direction, and the voltage corresponding to the strain along the y-axis direction undergo a change centering around Vreg/2. Further, during the time period when the switch SW 6 is in the OFF-condition, potential at the node 31g, under no load, will be Vreg/2, so that the voltage corresponding to the strain along the z-axis direction undergoes a change from Vreg/2. In other words, the resistor 34 is provided so that the voltages corresponding to the respective strains along the x-axis direction, the y-axis direction, and the z-axis direction are aligned with each other.

Reference data outputted from the digital processing circuit 22 is converted into an analog reference voltage by the DAC 28 to be subsequently inputted to the noninverting input side of the operational amplifier 23. The reference data outputted from the digital processing circuit 22 is converted into the analog reference voltage by the DAC 29 to be subsequently inputted to the noninverting input side of the operational amplifier 24. Accordingly, the voltage corresponding to the strain along the x-axis direction, and the voltage corresponding to the strain along the y-axis direction are alternately amplified by the operational amplifier 24 during the time period when the rectangular waves Asw 4, Asw 5, shown in FIG. 5, are being held high, respectively, and the voltage corresponding to the strain along the z-axis direction is amplified by the operational amplifier 23 during the period when the rectangular wave Asw 6, shown in FIG. 5, is being held low.

Rectangular waves Asw 7, and Asw 8, undergoing an alternate change in level, for every detection period T3 as shown in FIG. 5, are inputted as switching control signals from the digital processing circuit 22 to the analog switches SW 7, and SW 8, respectively, the analog switches SW 7, and SW 8 being provided on the output side of the operational amplifiers 23, 24, respectively. The analog switches SW 7, and SW 8 are each turned ON during a time period when the rectangular waves Asw 7, and Asw 8 are being held high, respectively, while the analog switches SW 7, and SW 8 are each turned OFF during a time period when the rectangular waves Asw 7, and Asw 8 are being held low, respectively, so that the analog switches SW 7, and SW 8 are alternately turned ON during the detection period T3. Further, a rectangular wave Asw 9 being held high for predetermined time τ from the rising edges of the rectangular waves Asw 4, Asw 5, and Asw 7, shown in FIG. 5, respectively, and being held low during the detection period except the predetermined time τ, is inputted as a switching control signal from the digital processing circuit 22 to the switch SW 9. Because the switch SW 9 is turned ON during a time period when the rectangular wave Asw 9 is being held high, and is turned OFF during a time period when the rectangular wave Asw 9 is being held low, the switch SW 9 is in the ON-condition only for the predetermined time τ from a start time of respective switchovers of the analog switches SW 7, SW 8. When the switch SW 9 is turned ON, both the ends of the resistor 25 are short-circuited, so that the voltage Vx 2 corresponding to the strain along the x-axis direction, the voltage Vy 2 corresponding to the strain along the y-axis direction, and the voltage Vz 2 corresponding to the strain along the z-axis direction periodically appear on the input side of the ADC 27, as shown in FIG. 5. Those voltages Vx 2, Vy 2, Vz 2, corresponding to the respective strains, are digitized by the ADC 27 before being inputted to the digital processing circuit 22.

Now, when the switch SW 9 is turned ON, both the ends of the resistor 25 are short-circuited, so that the capacitor 26 is charged or discharged at a response speed corresponding to a drive capacity of the operational amplifier 24. For this reason, the voltage Vx 2 corresponding to the strain along the x-axis direction, and the voltage Vy 2 corresponding to the strain along the y-axis direction undergo a change at a response speed corresponding to the drive capacity of the operational amplifier 24, and the capacitance of the capacitor 26. As with the first embodiment, the response speed described is sufficiently faster than the response speed of the conventional signal processing system 41, so that respective waveforms of the voltages Vx 2, Vy 2 rapidly reach a given value.

An operation taking place upon the switch SW 9 being turned OFF after the elapse of the predetermined time τ, and noise removal characteristics of the low pass filter made up of the resistor 25 and the capacitor 26 are similar to those in the case of the first embodiment, omitting therefore description thereof.

Thus, the present embodiment has merits in that by use of a common type pointing device comprising x-axis strain sensors, and y-axis strain sensors, a function of tapping (clicking) and determining respective loads on the sensors in whole is added to the first embodiment, thereby realizing enhancement in operability of the pointing device, and expansion in the function of the system.

Further, with the present embodiment, the voltage corresponding to the strain along the x-axis direction, and the voltage corresponding to the strain along the y-axis direction are switched over by the analog switches SW 4, SW 5, respectively, to be fed to the single operational amplifier 24, thereby causing the operational amplifier 24 to double as an operational amplifier for amplification of the voltages corresponding to the respective strains along two-axes directions, however, an operational amplifier for amplification of the voltage corresponding to the strain along the x-axis direction, and an operational amplifier for amplification of the voltage corresponding to the strain along the y-axis may be individually provided such that those operational amplifiers each serve as a dedicated operational amplifier for amplification of the voltage corresponding to the strain along one axis.

The invention claimed is:

1. A signal processing system for processing signals outputted from a pointing device, said signal processing system comprising:
   a first amplifier for amplifying a detection signal outputted by operating an operation console of the pointing device, along an x-axis direction thereof,
   a second amplifier for amplifying a detection signal outputted by operating the operation console, along a y-axis direction thereof,
   a first switching circuit for alternately switching over between respective output signals of the first and second amplifiers by the predetermined period before outputting, and
   a circuit for ac-grounding an output side of the first switching circuit for predetermined time upon switchover of the first switching circuit,
   wherein the circuit for ac-grounding the output side of the first switching circuit comprises:

a first low pass filter made up of a resistor and a capacitor, connected between the output side of the first switching circuit and the ground, and a second switching circuit connected to both ends of the resistor, wherein the second switching circuit is turned on upon the switchover of the first switching circuit, and is turned off after the elapse of predetermined time from the switchover, a second low pass filter for removing low frequency noises of the output signal of the first amplifier, and a third low pass filter for removing low frequency noises of the output signal of the second amplifier, wherein an upper cut-off frequency of the first low pass filter is set lower than respective upper cut-off frequencies of the second, and third low pass filters.

2. A signal processing system for processing signals outputted from a pointing device, the pointing device comprising detection means capable of outputting respective detection signals outputted by operating an operation console in plus and minus directions, along an x-axis, and a y-axis, thereof, respectively, in such a way as to identify whether an operation is in either the plus direction or the minus direction, along the x-axis, and the y-axis, respectively, or in both the plus and minus directions, along the x-axis, and the y-axis, respectively, a first outputting means for fetching the detection signals outputted by the operation in either the plus direction or the minus direction, along the x-axis, and the y-axis, respectively, from the detection means, and a second outputting means for fetching the detection signals outputted by the operations in both the plus and minus directions, along the x-axis, and the y-axis, respectively, said signal processing system comprising:

a first switching circuit for alternately switching over between the detection signals by the operation along an x-axis direction, and a y-axis direction, respectively, outputted from the first outputting means, before outputting, a first amplifier for amplifying the detection signals by the operation along the x-axis direction, and the y-axis direction, respectively, outputted from the first switching circuit, a second amplifier for amplifying output signals of the second outputting means, a second switching circuit for alternately switching over between respective output signals of the first and second amplifiers by the predetermined period before outputting, and a circuit for ac-grounding an output side of the second switching circuit for predetermined time upon respective switchovers of the first and second switching circuits, wherein the circuit for ac-grounding the output side of the first switching circuit comprises:

a first low pass filter made up of a resistor and a capacitor, connected between the output side of the second switching circuit and the ground, and a third switching circuit connected to both ends of the resistor, wherein the third switching circuit is turned on upon respective switchovers of the first and second switching circuits, and is turned off after the elapse of predetermined time from the respective switchovers, a second low pass filter for removing low frequency noises of the output signal of the first amplifier, and a third low pass filter for removing low frequency noises of the output signal of the second amplifier, wherein an upper cut-off frequency of the first low pass filter is set lower than respective upper cut-off frequencies of the second, and third low pass filters.

3. A signal processing system according to claim 2, wherein the detection means comprises a first resistance element having a resistance value undergoing a change corresponding to a load applied thereto, by the operation in the plus direction, along the x-axis, a second resistance element connected in series to the first resistance element, having a resistance value undergoing a change corresponding to a load applied thereto, by the operation in the minus direction, along the x-axis, a third resistance element having a resistance value undergoing a change corresponding to a load applied thereto, by the operation in the plus direction, along the y-axis, and a fourth resistance element connected in series to the third resistance element, having a resistance value undergoing a change corresponding to a load applied thereto, by the operation in the minus direction, along the y-axis, wherein a power supply is fed to one end of each of series-connected circuits, and a terminal connected to a node between the first and second resistance elements, and a terminal connected to a node between the third and fourth resistance elements serve as the first outputting means while a terminal connected to the end of each of the series-connected circuits, on a side adjacent to the power supply, serves as the second outputting means.

* * * * *